United States Patent
Gonzáles Valdés et al.

(10) Patent No.: US 10,895,636 B2
(45) Date of Patent: Jan. 19, 2021

(54) AIRBORNE SYSTEMS AND DETECTION METHODS LOCALIZATION AND PRODUCTION OF IMAGES OF BURIED OBJECTS AND CHARACTERIZATION OF THE COMPOSITION OF THE SUBSURFACE

(71) Applicants: UNIVERSIDAD DE OVIEDO, Oviedo (ES); UNIVERSIDAD DE VIGO, Vigo (ES)

(72) Inventors: Borja Gonzáles Valdés, Oviedo (ES); Yuri Alvarez López, Oviedo (ES); Ana Arboleya, Oviedo (ES); Yolanda Rodríguez Vaqueiro, Oviedo (ES); María García Fernández, Oviedo (ES); Fernando Las-Heras Andrés, Oviedo (ES); Antonio García Pino, Oviedo (ES)

(73) Assignees: UNIVERSIDAD DE OVIEDO, Oviedo (ES); UNIVERSIDAD DE VIGO, Vigo (ES)

( * ) Notice: Subject to any disclaimer, the term of this patent is extended or adjusted under 35 U.S.C. 154(b) by 194 days.

(21) Appl. No.: 16/071,686

(22) PCT Filed: Jan. 18, 2017

(86) PCT No.: PCT/ES2017/000006
§ 371 (c)(1),
(2) Date: Jul. 20, 2018

(87) PCT Pub. No.: WO2017/125627
PCT Pub. Date: Jul. 27, 2017

(65) Prior Publication Data
US 2019/0033441 A1    Jan. 31, 2019

(30) Foreign Application Priority Data
Jan. 21, 2016    (ES) .................................. 201600073

(51) Int. Cl.
*G01S 13/88* (2006.01)
*G01S 13/90* (2006.01)
(Continued)

(52) U.S. Cl.
CPC ............ *G01S 13/885* (2013.01); *G01C 11/00* (2013.01); *G01S 7/003* (2013.01); *G01S 7/40* (2013.01);
(Continued)

(58) Field of Classification Search
CPC ...... G01S 13/885; G01S 13/904; G01S 13/88; G01S 19/43; G01C 11/00
See application file for complete search history.

(56) References Cited

U.S. PATENT DOCUMENTS

| 5,673,050 A | 9/1997 | Moussally et al. |
| 5,952,954 A | 9/1999 | Beckner |

(Continued)

FOREIGN PATENT DOCUMENTS

CN    102221697 A    10/2011

OTHER PUBLICATIONS

International Search Report (ISR) and Written Opinion (WO) dated Mar. 2, 2017 for International Application No. PCT/ES2017/000006.

(Continued)

*Primary Examiner* — Erin F Heard
*Assistant Examiner* — Donald H B Braswell
(74) *Attorney, Agent, or Firm* — Ladas & Parry LLP

(57) ABSTRACT

Airborne systems and methods for the detection, location and obtaining of images of buried objects and for the characterization of the composition of the subsoil. The systems comprise at least one aerial module with a radar unit that emits and/or captures radar signals and a positioning and guidance system with an accuracy equal to or less than (Continued)

3 cm, and a ground station with a flight control system and a radar signal processing unit where radar signal processing algorithms are applied. The invention also comprises a method for the detection, localization and obtaining of images of buried objects and a method for the characterization of the composition of the subsoil. Applicable in sectors where it is necessary to perform the detection of buried objects, as for example in civil applications (detection of antipersonnel mines), pipeline inspection or in archaeology.

33 Claims, 4 Drawing Sheets

(51) Int. Cl.
*G01C 11/00* (2006.01)
*G01S 7/00* (2006.01)
*G01S 7/40* (2006.01)
*G01S 19/43* (2010.01)
*B64C 39/02* (2006.01)

(52) U.S. Cl.
CPC ............ *G01S 13/88* (2013.01); *G01S 13/904* (2019.05); *G01S 19/43* (2013.01); *B64C 39/024* (2013.01); *B64C 2201/108* (2013.01); *B64C 2201/123* (2013.01); *B64C 2201/145* (2013.01); *B64C 2201/146* (2013.01); *G01S 13/9076* (2019.05)

(56) References Cited

U.S. PATENT DOCUMENTS

| | | | |
|---|---|---|---|
| 7,057,548 B1* | 6/2006 | Roberts | G01S 5/16 342/22 |
| 8,854,248 B2 | 10/2014 | Paglieroni et al. | |
| 9,207,316 B2 | 12/2015 | Stolarczyk et al. | |
| 2011/0298655 A1* | 12/2011 | Leva | G01S 13/9023 342/25 C |
| 2013/0082856 A1 | 4/2013 | Paglieroni et al. | |
| 2014/0062758 A1 | 3/2014 | Mohamadi | |
| 2014/0125509 A1 | 5/2014 | Stolarczyk et al. | |
| 2015/0261217 A1* | 9/2015 | Gil | B64C 39/024 701/2 |

OTHER PUBLICATIONS

George Moussally, et al., "Wide-area Landmine survey and detection system", Jun. 21, 2004, XP002792840, Retrieved from the Internet: URL:https://ieeexplore.ieee.org/org/document/1343563.
Office Action issued in foreign counterpart China patent application 201780019054.4. with English translation thereof.
Search report issued in foreign counterpart European patent application 17741130.3.
Machine English translation of the Abstract of CN102221697.

* cited by examiner

AIRBORNE SYSTEMS AND DETECTION METHODS LOCALIZATION AND PRODUCTION OF IMAGES OF BURIED OBJECTS AND CHARACTERIZATION OF THE COMPOSITION OF THE SUBSURFACE

RELATED APPLICATION

This application is a national phase entry under 35 USC 371 of International Patent Application No.: PCT/ES2017/000006 filed on 18 Jan. 2017, which claims priority from Spanish application No. P201600073 filed on 21 Jan. 2016 the entire contents of which is incorporated herein by reference.

The present invention relates to systems for obtaining images of any buried object of any composition and to characterize the composition of the subsoil. A system comprises at least one transmitter and receiver aerial module, one ground station and a communication system between elements. The other system is similar to the previous one, but it includes at least one transmitter aerial module and another receiver aerial module. The invention also relates to the radar signal processing methods for obtaining the radar image of the subsoil and to the possible objects buried in the subsoil, including its detection and its location, and to characterize the composition of the subsoil.

The invention is applicable in those sectors in which it is necessary to perform the detection of buried objects, such as, for example, civil applications for mine detection, pipe inspection, archaeology, or hole or cavity detection.

STATE OF THE ART

The detection of hidden objects in a medium not transparent to visible light using non-invasive techniques or Non Destructive Techniques (NDT) has been of great interest in multiple human activities, such as mining and geology, construction and civil engineering, and archaeology, among others. Non-invasive techniques allow detection, localization and, as an ultimate goal, obtaining an image of the hidden object in the environment that surrounds it, without interacting either with the medium or with the object itself. The advantages of these systems are basically the economy in resources and time, not being necessary to carry out blind or random excavations in the area of interest to be able to find the objects. Likewise, it is guaranteed that, in the case of objects of a certain value, they do not suffer damages derived from the excavation Within the applications described in the previous paragraph, there are scenarios in which it is necessary to inspect surfaces for the detection of potentially dangerous objects hidden under them, such as weapons or explosives. Under these conditions, the detection and identification must be carried out under security conditions that guarantee the integrity of both the detection equipment and the operators themselves.

Within the mentioned scenarios, it is of special interest the detection of antipersonnel mines, which are responsible for 4,000 deaths and mutilations each year, 90%, corresponding to civilians, in the approximately 60 countries in which part of their territory is planted with this type of explosives. It is estimated that there are currently between 59 and 69 million antipersonnel mines buried in the world (International Campaign to Ban Landmines, Why Landmines Are Still a Problem [retrieved on 2015-11-10]. Retrieved from the Internet: <http://www.icbl.org/en-gb/problem/why-landmines-are-still-a-problem.aspx> and Communications UNICEF, Colombia and anti-personnel mines: sowing mines, harvesting death [retrieved on 2015-11-10]. Recovered from the Internet: <http://www.unicef.org/colombia/pdf/minas.pdf>).

The methods for the detection of anti-personnel mines can be classified into two main groups:

Invasive methods, in which a device capable of detonating the possible mines by contact is used. Low-cost but single-use systems have been devised (the most widespread is MineKafon, (Massoud Hassani, MineKafon [retrieved on 2015-11-10]. Retrieved from the Internet: <http://minekafon.blogspot.it/>), as well as more robust systems, capable of supporting several detonations at the expense of increasing the price and complexity of the device (Way Industries A. S, Slovakia, Bozena Systems [retrieved on 2015-11-10]. Retrieved from the Internet: <http://www.bozena.eu/common/file.php?file=44> and Nicoud, J D, & Habib, M K (1995, August). The pemex-b autonomous demining robot: perception and navigation strategies. Proceedings on 1995 IEEE/RSJ International Conference on Intelligent Robots and Systems 95. 'Human Robot Interaction and Cooperative Robots', Vol. 1, pp. 419-424, IEEE.) The main drawback of these systems is their impact on the explored terrain, burning it to perform the exploration. As an advantage, their exploration capacity stands out, since they analyse 1 square meter in 0.73 seconds.

Non-invasive techniques, in which from the proper processing of a set of received signals it is possible to detect the presence of buried objects.

Non-invasive techniques can, at the same time, be classified according to the physical phenomenon on which the detection is based (Robledo, L., Carrasco, M., & Mery, D. (2009). A survey of land mine detection technology. *International Journal of Remote Sensing*, 30 (9), 2399-2410):

Electromagnetic induction. It is based on inducing an electric current in buried metal objects using a transmitter coil. Said current in turn re-radiates an electric field that is detected in a receiver coil. The advantage of this technique is its low cost and simplicity of operation. As a drawback, it has a high rate of false alarms, due to the large number of buried metal objects that may be in a scenario (remnants of shrapnel, screws . . . ).

Ground Penetrating Radar (GPR). Considered one of the best techniques to obtain images of the subsoil, it is based on emitting electromagnetic waves capable of penetrating the subsoil, and capture the reflected waves to create a detection and a radar image, thus identifying possible buried objects. However, it is a technique very sensitive to the composition of the subsoil and the relief or roughness of the ground, requiring signal processing techniques to be able to eliminate false echoes and other artifacts present in the radar image (clutter).

Nuclear Quadrupole Resonance (NQR). It is based on the observation of radiofrequency signals of certain substances characteristic of explosive materials. These systems yield high probability of detection, although their complexity is high.

Acoustic and seismic systems. Its operating principle is similar to GPR, based on the emission of acoustic waves through the ground. The adequate processing of the received signal allows carrying out the identification of possible buried objects. The false alarm rate is lower than in the case of electromagnetic induction systems. As a disadvantage, the scan time ranges from 2 to 15 minutes per square meter.

Other non-invasive detection techniques that are also feasible, but less used due to their high operative and technological costs, are:

Image analysis in visible or infrared band, which detects surface patterns that correspond to land where mines have been planted.

Radiography, which has high detection but is limited to the detection of buried mines near the surface (10 cm or less). In addition it shows restrictions for X-ray operation.

Chemical or biological sensors to detect chemical components of the explosive material that come to the surface through micro-fissures of the mine framework.

Regardless of the physical principle, application of non-invasive techniques for mine detection requires that the detector system keeps a safe distance with respect to the possible location of the mine. The recommended distance is 3-5 m away, to avoid that the weight of the detector system may cause detonation of the explosive. To achieve this goal there are different possibilities:

Use radar stand-off systems. In this systems the ground is illuminated with an angle of incidence such that the amount of energy that penetrates is maximized. In this case, the problem arises because, according to Snell's law, the reflected energy will go in the opposite direction of the radar, which decreases the sensitivity of the system.

Examples of these systems are described in the patent documents U.S. Pat. No. 8,193,965 B2 and U.S. Pat. No. 7,479,918 B2, where the processing capacity is improved using polarimetric techniques.

Use systems capable of illuminating the ground with perpendicular incidence to the ground (or also called normal incidence). Although it is not possible to couple the maximum energy to the ground, this fact is compensated with the possibility of getting closer to it and of being able to capture more reflected energy. In this type of systems the difficulty lies in getting to provide perpendicular illumination to the ground keeping the safety distance of 3-5 m in the vicinity of the radar.

Within the alternatives of perpendicular incidence to the ground, there is the possibility of using autonomous unmanned robots of reduced size and weight, which can carry out the detection of mines with a reduced (but not null) risk of detonation. For example, in the publication by Gonzalez de Santos, P., Garcia, E., Estremera, J., & Armada, M. A. (2005). DYLEMA: Using walking robots for landmine detection and location. *International Journal of Systems Science*, 36 (9), 545-558, a robot equipped with a detector system based on electromagnetic induction and a Global Positioning System (GPS) differential (DGPS) for monitoring and path control is presented. One limitation is the scanning speed, which is 5 cm per second.

Similarly, patent document U.S. Pat. No. 7,511,654 B1 proposes a mine detection system based on GPR, in which a robotic vehicle is used to create a radar image of the subsoil, which allows to detect buried objects and, consequently, mines. The invention is based on burying a transmitter and receiver antenna in the ground in different positions separated by half wavelength, so that the coherent combination of the received signal in each position allows to create a two-dimensional radar image (in range or scope, and in cross-range or direction of movement of the robot). This system, therefore, has the capacity to realize radar image with synthetic aperture (SAR). As a main inconvenience, it is slow to carry out the inspection process.

An alternative to the use of land vehicles and their limitations in terms of land reconnaissance speed (as well as the potential risk of detonation when in contact with the ground) is the use of air vehicles as a detector system. Among them, we can highlight the UAV (Unmmaned Aerial Vehicles) because the ease of access to UAVs of small dimensions and its simplicity of manoeuvrability have triggered its use in multiple disciplines.

In the radar field, in the publication of Marc Lort, Albert Aguasca and Xavier Fabregas (2015). Interferometric and Polarimetric X-band SAR sensor integrated in a small UAV multicopter platform, 2015 *URSI National Symposium*, Pamplona, September 2015, a polarimetric radar is mounted on a UAV to make radar imaging. Polarimetric radars have the advantage that they allow measuring the response of different materials to electromagnetic waves, being able to use this property not only to obtain the radar image, but the composition of the materials. Like many UAV systems, it incorporates a GPS receiver with an inertial measurement unit (IMU) to determine the position of the UAV during the flight. Due to the limit bandwidth of this system, resulting in a resolution in the range of 1.5 m, it does not allow to detect objects that may be buried at a lower depth, since it would not be possible to distinguish between the reflection at the air-ground interface and the reflection due to the buried object.

Another SAR radar application mounted on a UAV is described in the paper by Chenchen J. Li, Hao Ling (2015) Synthetic aperture Radar imaging using a small consumer drone, *IEEE Antennas and Propagation International Symposium*, 2015, Vancouver. The radar, which operates in the 3.1 to 5.3 GHz band, has been mounted on a drone type-UAV. Wi-Fi communication modules are used for communication with a ground station for flight control and reception of radar data. The advantage of this radar system with communications module is that it is compact and lightweight (less than 300 g), so that it can be easily mounted on the UAV. However, the system to make SAR image has not yet been satisfactorily tested in flight for perpendicular illumination of the ground (downward-looking SAR) due to the instability in the flight path of the UAV. The UAV incorporates a GPS receiver and inertial sensors, which do not provide sufficient positioning accuracy for a correct coherent combination of the radar signal data measured at each UAV flight position.

In the field of the detection of explosive objects buried by means of GPR systems on board UAVs, already in the document by Goad, A., Schorer, D., Sullenberger, J., Yousuf, F., Yu, A., Donohue, G., & Hintz, K. (2008, April). Landmine detection utilizing an unmanned aerial vehicle, Systems and Information Engineering Design Symposium, 2008. SIEDS 2008, IEEE (pp. 231-236), the ability of a radar installed in a UAV to detect mines is analysed, taking into account different parameters such as the diameter of the mine, the signal to noise ratio of the radar and flight height. However, the authors of the study conclude that for the studied UAVs, the system is not feasible because it is necessary to pilot a UAV of considerable size (such as Shadow 200, Shadow 600 and Predator models) at a height lower than its operational height (in order to detect the mines), which may put the UAV in danger due to the risk of collision with the ground.

Subsequently, in the document by Rodriguez, J., Castiblanco, C., Mondragon, I., & Colorado, J. (2014, May). Low-cost quadrotor applied for visual detection of landmine-like objects, IEEE 2014 International Conference on Unmamnned Aircraft Systems (ICUAS) pp. 83-88, the use of a UAV of small dimensions and weight is proposed for the detection of mines that are not buried from the analysis of photographs. Notable features of this system include the use of a Wi-Fi connection for communication between the UAV and a fixed ground station, as well as having a UAV positioning unit formed by different sensors (IMU, magnetometer, altimeter) that allows the system to trace exploration trajectories.

In the patent document US 2007/0035304 a detection system is proposed formed by an air unit where the transmitter is installed and an aerial trailer where the receiver is, thus configuring a bistatic system that works in the frequency range from 80 kHz to 1 MHz. In this case, the system is based on electromagnetic induction, determining the position of the objects detected from the time of flight between the transmitted signal and the detected echo. In a bistatic system, the relative position between the transmitter and the receiver is always the same, so that the soil is always illuminated with the same angle. For certain applications, it may provide more information than a monostatic system (the one in which the radar signal is transmitted from the same point it is received), but it is more limited than a multistatic system, where the separation between the transmitter and receiver can be modified to have more spatial diversity.

Polarimetric techniques have also been applied in onboard UAV systems for GPR applications, as described in patent document U.S. Pat. No. 7,528,762 B2, where the system, designed to work in the 1 MHz to 1 GHz band, employs a technique of signal processing based on polarimetry that allows to eliminate the air-soil clutter. This technique is based on selecting, in the first place, the frequency and the angle of incidence suitable to maximize the penetration in the soil taking into account the characteristics of the soil and the depth of penetration. Next, the scattered field is acquired for the two polarizations, typically orthogonal to each other, and the coherent difference between the two signals is calculated. The echoes that are not cancelled correspond to reflections in buried objects, because the subsoil changes the polarization of the field differently from the object to be detected (since in general the subsoil and the object will have different composition). With respect to the hardware, an on-board system is contemplated, placing the antennas in the blades of a helicopter. The main limitation of this processing technique is that it is only suitable for stand-off systems (the radar is at a distance of several meters from the surface to be scanned).

The invention described in the patent document US 2014/0062754 A1 is based on a GPR system mounted on a UAV, which is able to position itself autonomously following a predefined trajectory (for example, in zigzag), using the information provided by a Differential GPS system. Furthermore, in case of loss of the GPS signal, the mentioned document contemplates that it is possible to use the information of inertial sensors to maintain the trajectory, such as magnetometers and gyroscopes. A flight height of 66 to 330 cm is defined, with a positioning accuracy of 16.5 cm. The working frequency range is from 4 to 6 GHz. The radar signal is processed in the system mounted on the UAV, and the resulting radar image is sent to a ground station via a wireless link. This system has a scan speed of 24 seconds per square meter (25 square meters in 10 minutes). In addition to the mentioned characteristics, this system also incorporates countermeasures to be able to deactivate the mine, landing the UAV on the area where the mine has been detected and using chemical elements capable of cancelling the explosive.

An invention similar to the previous one is described in patent document US 2014/0062758 A1. In this case, the system is able to identify irregular ground patterns with an optical and a thermal camera. Once detected, a GPR radar is used to detect possible buried objects. If positive, it is capable of applying the countermeasures mentioned in the previous invention to cancel the explosive capacity. In addition, it contemplates the use of a low resolution radar for the detection of buried objects. If the detection is positive, it is switched to a high resolution radar for a better identification of the buried object.

In the inventions listed above where a GPR radar is installed on board a UAV for mine detection (U.S. Pat. No. 7,528,762 B2, US 2014/0062754 A1, US 2014/0062758 A1) there is no possibility to obtain a radar image based on synthetic aperture, that is, coherently combining the radar measurements taken in the different positions of the UAV flight. This is because the positioning accuracy is 16.5 cm (in the best of cases), 6.6 times higher than the working wavelength of the radar system (6 GHz at the highest frequency). In order to be able to use synthetic aperture techniques it is necessary that the data acquisition positions are separated by half a wavelength at the working frequency. The point-to-point representation of the radar signal processed in range or scope supposes a loss of spatial resolution (cross-range) with respect to the SAR processing (see FIG. 1).

The possibility of using a set of UAVs is described in patent document U.S. Pat. No. 6,653,970 B1. In the this document, a UAV emits a signal that is received in one or several UAVs, being the position of all of them known. The system is used for the detection of targets in environments with high multipath (such as mountainous areas or with numerous constructions where the transmitted signal suffers multiple reflections), using delay measurement as a method to detect the positions of the targets. The use of multistatic systems (that is, the transmitter and the receiver are in different positions) allows to increase the information obtained from the scenario under study by having more lighting angles (Alvarez, Y., Rodriguez-Vaqueiro, Y., Gonzalez-Valdes, B., Mantzavinos, S., Rappaport, C M, Las-Heras, F., & Martinez-Lorenzo, J A (2014), Fourier-based imaging for multistatic radar systems, *Microwave Theory and Techniques, IEEE Transactions on,* 62 (8), 1798-1810); Gonzalez-Valdes, B., Rappaport, C., Lorenzo, M., Jose, A., Alvarez, Y., & Las-Heras, F. (2015, July). Imaging effectiveness of multistatic radar for human body imaging, Antennas and Propagation & USNC IRSI National Radio Science Meeting, 2015 *IEEE International Symposium* on (pp. 681-682). IEEE). Although the invention described in patent document U.S. Pat. No. 6,653,970 B1 indicates that SAR processing is used, the measurement of the position of the transmitting UAV and of the receivers is based on GPS receivers, therefore the obtained precision in the position can not be less than 1 m (which is the GPS accuracy in civilian use in the best operating conditions), which makes the detection of targets inaccurate, with position errors that in many applications exceed the admissible threshold.

Although the majority of mines are metallic, easy to detect by most systems, plastic explosives, whose low dielectric contrast with respect to the subsoil in which they are buried makes detection difficult, have recently been developed. In this regard, a possible solution is the determination of the composition of the subsoil to be able to use it as a contrast to the material that is intended to be detected.

Thus, for example, the invention contained in patent document U.S. Pat. No. 8,849,523 B 1 describes a system with the capacity to determine the composition of the subsoil using a GPR radar, although it is on board a tractor-type land vehicle used for the sowing of seeds, which greatly penalizes the speed of analysis. On the other hand, this patent does not specify what the method to determine the composition of the subsoil is, thus missing the precision features, if it estimates both the permittivity and conductivity, or what processing algorithm is used.

There are several techniques to determine the constitutive parameters of the subsoil. For example, in the publication by Ramirez, A., Daily, W., LaBrecque, D., Owen, E., & Chesnut, D. Monitoring an underground steam injection process using electrical resistance tomography, Water Resources Research, Vol. 29, No. 1, pp. 73-87, 1993 and in that of Zhou, Q Y, Shimada, J., & Sato, A., Three-dimensional spatial and temporal monitoring of soil water content using electrical resistivity tomography, Water Resources Research, Vol. 37, No. 2, pp. 273-285, 2001, low-frequency electrical resistivity tomography (ERT) and electromagnetic induction (EMI) are used to determine the water content of the subsoil. In the Hendrickx publication, J M H, Borchers, B., Corwin, D L, Lesch, S M, Hilgendorf, A C, & Schlue, J., Inversion of soil conductivity profiles from electromagnetic induction measurements, *Soil Science Society of America Journal*, Vol. 66, No. 3, pp. 673-685, 2002 these techniques are also used to determine the conductivity of the subsoil. Although these techniques allow the characterization of the subsoil and the detection of possible buried objects, the nature of the signals used does not allow obtaining high resolution images of the subsoil that facilitate the identification of, among others, the buried objects that are intended to be located.

With respect to the use of GPR systems, in the document by Busch, S., Van der Kruk, J., & Vereecken, H., Improved characterization of fine-texture soils using on-ground GPR full-waveform inversion, *IEEE Transactions on Geoscience and Remote Sensing*, Vol. 52, No. 7, pp. 3947-3958, July 2014 is proposed an electromagnetic model that characterizes the subsoil, considering a cost function that minimizes the difference between the measured electromagnetic field and the electromagnetic field radiated by the electromagnetic model that characterizes the subsoil. When said difference is minimal, it is considered that the constitutive parameters of the subsoil have been found. The limitation of this method is the establishment of an electromagnetic model that increases the complexity of the system. Especially critical is the fact that it is based on global and local optimization techniques, which are quite sensitive to uncertainties in the measurements, which may lead to an erroneous estimation of the constituent parameters of the subsoil.

In the publication of C. R., Morton Jr, K. D., Collins, L. M., & Torrione, P. A., Analysis of linear prediction for soil characterization in GPR data for countermine Applications, Sensing and Imaging, Vol. 15, No. 1, pp. 1-20, 2014 the importance of the correct characterization of the subsoil is mentioned in applications for GPR and, specifically, applied to the detection of mines:

"Although the phenomenology behind GPR is essentially the same as airborne or terrestrial radar, the act of transmitting and receiving signals through the earth poses many signal processing challenges that are unique to GPR. Unlike conventional radar, the propagation channel in GPR is naturally heterogeneous—the presence of subsurface clutter is quite common, and local differences in soil density and moisture content may affect the dielectric properties that govern propagation velocity and the strength of target signatures. GPR signals must also interact with the soil surface (as well as other subsurface interfaces, such as road beds), which is generally not smooth and contributes to additional signal clutter".

Estimation of the constitutive parameters is typically done by linear prediction (LP) models based on autoregressive processes (AR) that use signal patterns known as a database (or training set) to later perform the classification of the measured signal, associating it to a certain type of subsoil. Although the precision obtained in the reconstruction of the parameters of the subsoil is high even in the case of highly non-homogeneous soils, the main drawback is the need to train the characterization algorithm, which requires having a large number of training measures carried out in real conditions that contemplate a multitude of different cases, in addition to restricting the algorithm for a specific GPR system (applying the algorithm in another GPR system would require making a new database).

DESCRIPTION OF THE INVENTION

The present invention relates to systems for obtaining images of any buried object of any composition and for characterizing the composition of the soil and the subsoil, comprising one or more aerial modules, a ground station and a communication system between elements. The invention also relates to the radar signal processing methods for obtaining the radar image of the subsoil and of the possible objects buried in the subsoil, including its detection and its location, and to characterize the composition of the subsoil.

For the purposes of this invention and its description, soil or indistinctly ground refers to the surface that separates the air from the subsoil, and subsoil to the material medium where the potential objects to be located are buried. The invention preferably relates to soil and subsoil, such as for example a land surface and the material medium situated under it, although it could also be applied more generally to other types of surfaces and material means, such as, for example, a water surface and the material medium where the potential objects to be located are submerged.

For the purposes of this invention and its description, operator refers to the person who is responsible for the supervision of the different systems and methods that make up the invention, as well as to interact with the different processes that require human-computer communication.

For the purposes of this invention and its description, the area under study refers to the soil and subsoil that is to be inspected in search of possible buried objects.

For the purposes of this invention and its description, aerial module and air module are used indistinctly and both refers to an aerial vehicle.

One aspect of the present invention is an airborne system for detection, location and imaging of buried objects. From now on, this aspect of the invention can be referred to as "monostatic system". The monostatic system comprises:

At least one air module which comprises a radar unit that emits and captures radar signals directed to and reflected by the ground, a positioning and guidance system of the air module, and an air control unit that collects information from the radar unit and from the positioning and guidance system, controls flight parameters of the air module and exchanges information with a ground station.

A ground station which comprises a flight control system of the air module, a unit for processing radar signals received from the radar unit that processes the radar signals by means of a set radar signal processing algorithms, and a computer application for the representation of the radar image of the subsoil obtained from the radar signal processing unit.

Communication means to issue and receive wireless signals between the air module and the ground station.

The positioning and guidance system of the air module comprises a global positioning system, a positioning system based on inertial sensors, a positioning system based on real-time satellite kinetic navigation or RTK (from Real Time Kinematic), which exchanges information with a real-time satellite kinetic navigation base station located at the ground station, and a positioning system based on photogrammetry. The positioning and guidance system sends information to the control unit, providing the accurate three-dimensional location of the air module and the georeference of the data obtained with the radar unit, with an accuracy equal or less than three centimetres.

The detection, localization and obtaining of images of buried objects is made from the information that the air module exchanges with the ground station, where it is processed in the radar signal processing unit by means of a set of algorithms for processing the radar signal. One of these algorithms is a SAR processing algorithm for obtaining the radar image and another is an algorithm for eliminating clutter of the radar image. The aforementioned algorithms require accurate three-dimensional localization (with a value equal to or less than half the wavelength for the maximum working frequency) of the aerial module and the georeferenced data obtained with the radar unit in order to carry out the coherent processing (i.e., using information of amplitude and phase of the measured radar signal) of the measured radar signal in different positions, thus creating a synthetic aperture radar.

One way to process the digitized radar signals received by a SAR processing algorithm and a clutter elimination algorithm is to store them in matrix form and associate them to a coordinate matrix, as will be explained later in this description.

Another aspect of the present invention is another airborne system for detection, location and imaging of buried objects. From now on, reference may be made to this other aspect of the invention as "multistatic system". The multistatic system includes:

At least one aerial module, which is a transmitter aerial module. It comprises a radar unit that emits radar signals, a positioning and guidance system for the transmitter aerial module, and an air control unit that collects information from the radar unit and the positioning and guidance system, controls flight parameters of the transmitter aerial module and exchanges information with a ground station.

At least one aerial module, which is a receiver aerial module, which comprises a radar unit that captures the radar signal, a positioning and guidance system of the receiver aerial module, and an air control unit that collects information from the radar unit and the positioning and guidance system, controls flight parameters of the receiver aerial module and exchanges information with a ground station.

A ground station which in turn comprises a flight control system of the transmitter aerial module and the receiver aerial module, a radar signal processing unit that processes the radar signals received from the radar unit by means of a set of radar signal processing algorithms, and a computer application for the representation of the radar image of the subsoil obtained from the radar signal processing unit.

Communication means to transmit and receive wireless signals between the transmitter aerial module and the ground station, between the receiver aerial module and the ground station, and between the transmitter aerial module and the receiver aerial module.

The positioning and guidance system of the transmitter aerial module and the receiver aerial module comprises a global positioning system, a positioning system based on inertial sensors, a positioning system based on real-time satellite kinetic navigation or RTK which exchanges information with a real-time satellite kinetic navigation base station located at the ground station, and a positioning system based on photogrammetry. The positioning and guidance system sends information to the air control unit, providing the accurate three-dimensional location of the transmitter aerial module and the receiver aerial module and the georeference of the data obtained with the radar unit with an accuracy equal to or less than three centimetres. A radar signal processing algorithm of the radar signal processing unit is a SAR processing algorithm for obtaining the radar image and another is a clutter elimination algorithm of the radar image.

In a preferred embodiment of either of the two systems, monostatic or multi-static, the aerial module is an unmanned aerial vehicle. In a more preferred embodiment, the unmanned aerial vehicle is of the multi-rotor type.

In another preferred embodiment of the monostatic system, the communication means comprise a bi-directional and real time communication system between the aerial module and the ground station, e.g. two low frequency transceivers, one located at the ground station and the other at the air module.

In another preferred embodiment of the multistatic system, the communication means comprise a bi-directional and real-time communication system between the transmitter aerial module and the ground station, a bi-directional and real-time communication system between the receiver aerial module and the ground station, and a bi-directional and real-time radar communication system between the radar unit on board the transmitter aerial module and the radar unit on board the receiver aerial module.

In another more preferred embodiment of the communication system between the aerial module and the ground station of the monostatic system or of the radar communication system between the radar units of the transmitter and receiver aerial vehicles of the multi-static system, said systems comprise one or more communication modules 3G/4G or one or more low frequency transceivers or an IEEE 802.11 (Wi-Fi) interface or one or more Zigbee modules or one or more Bluetooth modules, or a combination of any of them. An example of this embodiment is a communication system formed by two ZigBee or Bluetooth modules, one located in the ground station and the other in an aerial module.

Another example of this embodiment is a communication system formed by two 3G/4G communication modules, one located in the ground station and the other in an aerial module. Another example of this embodiment is a communication system formed by two IEEE 802.11 (Wi-Fi) communication interfaces, one located at the ground station and the other in an aerial module. Another example of this embodiment is a system formed by two low frequency transceivers, one located in the ground station and the other in an aerial module. Another example of this embodiment is a radar communication system between the two radar modules on board the two aerial modules, formed by two low frequency transceivers, each one on board an aerial module.

In a particular embodiment of the monostatic system, the radar unit of the aerial module comprises:

A transmitter antenna and a receiver antenna.

A radar module for the generation of an electromagnetic signal in a frequency band whose upper frequency is equal to or less than 5 GHz, and for the reception of the scattered electromagnetic signal.

In a specific embodiment of the multistatic system, the radar unit of the transmitter aerial module comprises:

A transmitter antenna.

A radar module for the generation of an electromagnetic signal in a frequency band whose upper frequency is equal to or less than 5 GHz.

In another specific embodiment of the multistatic system, the radar unit of the receiver aerial module comprises:

A receiver antenna.

A radar module for the reception of the scattered electromagnetic signal.

In a particular embodiment, the transmitter and receiver antennas will have circular polarization, with the circular polarization of the transmitter antenna being orthogonal to the circular polarization of the receiver antenna. In an even more particular embodiment, the transmitter and receiver antennas are helical-type antennas, with a parameter Si 1 lower than −15 dB in the frequency band in which the radar module operates, and a gain greater than 10 dB. In another preferred embodiment, the receiver antenna is formed by an array of two elements, with the circular polarization of each element being orthogonal to the circular polarization of the other element. The element from which it is desired to receive the radar signal is selected by a switch that connects the element to the radar unit. The switching between the two elements allows obtaining polarimetric information.

In another particular embodiment of the mono-static system or the multi-static system, the flight control system of the air module or of the aerial modules comprises a manual flight control system and a system for the generation of trajectories and automatic flight control. By means of these systems, it is possible to plan in advance the exploration of the area of interest, the predetermination of the movement of the aerial module or the relative position between several aerial modules. It is also possible to implement an adaptive system that, in real time, determines efficient trajectories according to a series of contour parameters (orography, boundaries, atmospheric conditions, etc.). Through the manual flight control system, an operator can monitor the development of the scan and at any time take control to make corrections or avoid accidents.

In this way, the scanning path followed by the aerial module intended to explore a certain area under study can be introduced by the system for generating trajectories and automatic control of the flight through, for example, a file of geo-referenced coordinates. Once introduced, the operator of the invention may instruct the system to start scanning. The manual flight control system will allow the operator of the invention to immediately take control of the flight of the aerial module in case of danger of collision, presence of strong winds that alters the automatic trajectory or other dangers, landing it in a safe place.

In another specific embodiment of the mono-static system or the multi-static system, the SAR processing algorithm for obtaining the radar image uses polarimetric information.

In a more specific embodiment, the polarimetric information is obtained from the acquisition of the radar signal for two orthogonal polarizations of the scattered electric field. In this way it is possible to increase the diversity of information, reconstructing a three-dimensional radar image for each polarization. These three-dimensional images are combined, allowing to carry out a better elimination of false radar and clutter echoes, since typically the soil, subsoil and possible buried objects present different type of response for different polarizations.

In another preferred embodiment of the mono-static system or the multistatic system, the set of radar signal processing algorithms also comprise an algorithm for correcting the defocusing of the radar image due to the uncertainty associated with the positioning and guidance system of the aerial module and an algorithm for the detection of buried objects.

In another particular embodiment of the monostatic system or of the multistatic system with a set of radar signal processing algorithms which are a SAR processing algorithm for obtaining the radar image and a clutter elimination algorithm of the radar image, it also comprises an algorithm for the characterization of the composition of the subsoil.

In a more particular embodiment of the previous one, the algorithm for the characterization of the composition of the subsoil carries out the estimation of the permittivity of the subsoil from the determination of the distance between the echo in the soil and the echo in a metallic calibration object, both observable in the radar image. In another more particular embodiment, the algorithm for the characterization of the composition of the subsoil carries out the estimation of the permittivity of the subsoil from the measurement of the difference in amplitude between the echo in the soil and the echo in a metallic calibration object. In another more particular embodiment, the clutter removal algorithm of the radar image is based on an iterative calculation process in which the effect of the soil on the radar image is identified on the basis of the altitude of the aerial module and on the estimation of the composition of the subsoil provided by the algorithm for the characterization of the composition of the subsoil and then removed from the image using a mask-based algorithm and a SAR processing algorithm to obtain the radar image.

For the purposes of this invention and its description, echo is the reflection that is observed in the radar image (or in a radar signal) when there is a change in the propagation medium. Thus, echo on the soil is the reflection of the signal when it hits the soil. Part of the energy is reflected (the echo) and part of the energy is transmitted to the subsoil. In the echo in a metallic calibration object, all the energy is reflected because it is a metallic object and does not allow an electromagnetic wave to cross it.

In a preferred embodiment of the monostatic system, the aerial module emits and captures radar signals establishing its position at different heights relative to the soil.

In a preferred embodiment of the multistatic system, the transmitter aerial module transmits a radar signals establishing its position at different heights relative to the ground and the receiver aerial module captures radar signals establishing its position at different heights relative to the ground.

In a more preferred embodiment of the monostatic system or of the above multistatic system in which radar signals are emitted and/or captured by establishing the position at different heights relative to the ground, the radar image created with the radar signals obtained at different heights are combined to detect, locate and obtain the image of the soil and objects buried in the subsoil.

In another more preferred embodiment of the mono-static system or of the multistatic system in which radar signals are emitted and/or captured by establishing the position at different heights relative to the ground, the SAR processing algorithm for obtaining the radar image is based on the coherent sum of the radar signal measured in two or more positions of the aerial module, provided that the separation between two consecutive positions is equal to or less than half a wavelength at the highest working frequency.

Another aspect of the present invention is a method for the detection, localization, and imaging of buried objects comprising the following steps:

a) Emit a radar signal generated by a radar unit towards the ground to be inspected.

b) Capture the radar signal reflected in the soil, subsoil and possible buried objects through a radar unit and determine the accurate three-dimensional location of the air module with an accuracy of equal to or less than three centimetres.

c) Send the radar signal and the accurate three-dimensional location of the aerial module to the ground station using the communication system.

d) Process the radar signal in the radar signal processing unit to obtain a three-dimensional image of the subsoil and detect and locate possible buried objects by means of a set of radar signal processing algorithms that comprise a SAR processing algorithm for obtaining the radar image and a clutter elimination algorithm for the radar image.

In a preferred embodiment of the method, the radar signal generated by the radar unit is emitted from a transmitter aerial module, and the reception of the radar signal reflected in the soil, subsoil and possible buried objects is carried out in the radar unit on board a receiver aerial module. The transmission and reception are synchronized by a radar communication system on board each air module.

In a particular embodiment of the method in which one or more aerial modules are used, the radar unit further processes the radar signal received in step b) to convert it to a digital sequence, and in step d) the signal processing unit radar processes the digitized radar signal. In this way, the radar signal converted to digital sequence is sent to the ground station where the radar signal processing unit processes the digitized radar signal using the set of radar signal processing algorithms.

In another preferred embodiment of the method in which one or more aerial modules are used, the radar signal is an of electromagnetic pulse train.

To carry out the detection and location of buried objects, the procedure described in the method [steps a) to d)] is repeated for each of the positions of the scanning path that the module or aerial modules follow to explore a certain area under study, which allows obtaining an image or a composition of images of the area of interest.

In another preferred embodiment of the method in which one or more aerial modules are used, the position of the aerial module is also varied and steps a), b) and c) are repeated before step d). In a more preferred embodiment, the radar image created with the radar signals obtained at different heights are combined to detect, locate and obtain the image of the soil and objects buried in the subsoil.

In another particular embodiment of the method in which one or more aerial modules are used or of the method in which one or more aerial modules are used and their position is varied, the SAR processing algorithm for obtaining the radar image is based on the coherent sum of the radar signal measured in two or more positions of the aerial module, provided that the separation between two consecutive positions is equal to or less than half a wavelength at the highest working frequency.

One way to treat the digitized radar signals received for each position is by storing them in a matrix, where each row of the matrix corresponds to a position. The coordinates of each position of the air module are stored in a coordinate matrix. Using the information of the positions of the aerial module, and known the size of the subsoil to be inspected, a transformation matrix is constructed that relates the points of the subsoil with the positions of the air module. The SAR processing performs mathematical operations with the transformation matrix and the matrix of the digitized radar signals to calculate the reflectivity of the soil and subsoil. This reflectivity is processed using the clutter elimination algorithm to highlight the possible presence of buried objects and to eliminate reflection from the ground. The clutter elimination procedure is iterative: i) known the radar signals and the positions where they have been measured, the SAR processing is applied to calculate the reflectivity in the area under study; ii) from the reflectivity in the area under study it is possible to identify the reflection of the radar signal in the ground; iii) a mask is applied that encompasses the region of the area under study corresponding to the reflection of the radar signal in the ground; iv) the radar signal that reflects the masked region is calculated; v) a new radar signal matrix is created equal to the initial radar signal matrix minus the radar signal that reflects the masked region; and vi) the SAR processing is applied to the matrix resulting from subtraction, obtaining the reflectivity in the area under study.

The steps i) to vi) are repeated a certain number of times, so that in each iteration the contribution due to the reflection in the ground (masked region) is attenuated. Finally, the processed reflectivity is shown as a three-dimensional image of the subsoil in the computer application developed for the representation of the radar image of the subsoil.

For the purposes of this invention and its description, reflectivity is a dimensionless magnitude relative to the intensity of the relation between the reflected radar signal and the incident radar signal at each point in the space.

In another preferred embodiment of the method in which one or more aerial modules are used or the method in which one or more aerial modules are used and their position is varied, the SAR processing algorithm for obtaining the radar image uses polarimetric information. In a further preferred embodiment, the information is obtained from the acquisition of the radar signal for two orthogonal polarizations of the scattered electric field.

In another preferred embodiment of the method in which one or more aerial modules are used or the method in which one or more aerial modules are used and their position is varied, in step d) the radar signal is processed in the radar signal processing unit by means of a set of radar signal processing algorithms that also comprises an algorithm to correct the defocusing of the radar image, and an algorithm for the detection of buried objects.

Thus, the SAR processing algorithm and the clutter elimination algorithm are combined with an algorithm to correct the defocusing of the radar image due to the uncertainty associated with the positioning and guidance system. The wind, changes in air pressure or similar situations can introduce small alterations in the trajectory to be followed by the air module. To carry it out, the method called Phase Gradient Autofocus (PGA) can be used, consisting of identifying characteristic points in different radar images, and correcting the blur by applying windowing and phase shift operations.

On the other hand, the three-dimensional image of the subsoil is processed by an algorithm for the detection of buried objects. This algorithm processes the three-dimensional image of the subsoil in search of groups of points with high reflectivity, which can correspond to buried objects.

The algorithm analyses the shape of the area or volume with high reflectivity and, based on training patterns stored in a database, decides whether it corresponds to a potential buried object or not. These training patterns are obtained from photographs of different types of buried objects (anti-personnel mines, archaeological remains, pipes, etc.) and can be calculated before scanning the area under study.

In a specific embodiment of the method in which one or more aerial modules are used or of the method which employs one or more aerial modules and their position is varied, the SAR processing algorithm and the clutter elimination algorithm are combined with an algorithm for the characterization of the composition of the subsoil. For this, prior to step a), the method also comprises the following steps:
  e) Burying a metallic calibration object in the subsoil.
  f) Emit a radar signal generated by a radar unit towards the ground where the metallic calibration object is buried.
  g) Capture the radar signal reflected in the ground, subsoil and in the metallic object of calibration through a radar unit, and determine the accurate three-dimensional location of the air module with an accuracy of equal to or less than three centimetres.
  h) Send the radar signal and the accurate three-dimensional location of the transmitter aerial module and the aerial receiver module to the ground station using the communication system.
  i) Process the radar signal in the radar signal processing unit to characterize the composition of the subsoil by means of an algorithm for the characterization of the composition of the subsoil in which the echo in the soil and the echo in a metallic calibration object are considered.

In a more specific embodiment of the above, steps e), f), g), h) and i) to characterize the composition of the subsoil are executed only once, prior to step a). Thus, the metal calibration object is buried in one place and the soil effect is determined once. After that, the exploration of the area of interest begins in order to locate and identify the possible buried objects, but with the information of the soil composition already known.

In another more specific embodiment of the method, the algorithm for the characterization of the composition of the subsoil carries out the estimation of the permittivity of the subsoil from the determination of the distance between the echo in the ground and the echo in a metallic object of calibration.

In another more specific embodiment of the method, the algorithm for the characterization of the composition of the subsoil carries out the estimation of the permittivity of the subsoil from the measurement of the difference in amplitude between the echo in the ground and the echo in an object calibration metal.

The algorithm for the characterization of the composition of the subsoil allows to calculate the permittivity value of the subsoil and, consequently, the speed of propagation of the radar signal in the subsoil, so that the transformation matrix used in the SAR processing can be constructed taking into account the speed of propagation of the signal both in the air and in the subsoil.

In another more specific embodiment of the method in which the composition of the subsoil is previously characterized by an algorithm for the characterization of the composition of the subsoil, the algorithm for eliminating the clutter from the radar image is based on an iterative calculation process in which the effect of the soil in the radar image is identified based on the altitude of the aerial module and the estimation of the composition of the subsoil provided by the algorithm for the characterization of the composition of the subsoil. Subsequently, the clutter is removed from the image using a mask-based algorithm and a SAR processing algorithm for obtaining the radar image.

Another aspect of the present invention is a method for characterizing the soil and subsoil composition comprising the following steps:
  a) Bury a metallic calibration object in the subsoil.
  b) Emit a radar signal generated by a radar unit towards the ground where the metallic calibration object is buried.
  c) Capture the radar signal reflected in the ground, subsoil and in the metallic calibration object through a radar unit, and determine the accurate three-dimensional location of the air module with an accuracy of equal to or less than three centimetres.
  d) Send the radar signal and the accurate three-dimensional location of the air module to the ground station using the communication system.
  e) Process the radar signal in the radar signal processing unit to characterize the composition of the ground and the subsoil by means of an algorithm for the characterization of the composition of the subsoil in which the echo in the ground and the echo in a metallic calibration object are considered.

In a preferred embodiment, the method for characterizing the composition of the subsoil is carried out before proceeding with the method for the detection, location and imaging of buried objects in which the scanning of the area under study is carried out, for the purpose of obtain the permittivity value of the subsoil that allows to calculate the speed of propagation of the radar signal in the subsoil.

In a specific embodiment, the emission in step b) is carried out from a transmitter aerial module with a radar unit transmitting a radar signal, and the reception of step c) is carried out by means of an aerial receiver module with another radar unit that captures the radar signal, both located in two different positions. In this embodiment, the transmission and reception are synchronized by a radar communication system.

In a preferred embodiment of the method in which one or two aerial modules are used, the algorithm for the characterization of the composition of the subsoil carries out the estimation of the permittivity of the subsoil from the determination of the distance between the echo in the soil and echo in a metallic calibration object.

In another preferred embodiment of the method in which one or two aerial modules are used, the algorithm for the characterization of the composition of the subsoil carries out the estimation of the permittivity of the subsoil by means of an algorithm that analyses the difference of amplitude between the echo in the ground and the echo in a metallic calibration object.

The invention provides systems for detecting, locating and obtaining a three-dimensional image of the subsoil as well as possible elements buried therein.

The systems of the invention allow to obtain images with a higher resolution with respect to the known systems. The ability to obtain centimetre-accurate images in three dimensions is achieved thanks to the systems providing accurate three-dimensional location of the aerial module or modules and the georeference of the data obtained with the radar unit. In order to use synthetic aperture radar (SAR) processing techniques it is necessary that the data acquisition positions are separated by a maximum half wavelength at the working frequency which, considering the operating frequencies of the system radar (5 GHz at the highest frequency) is a design limitation for traditional systems that this invention overcome in an innovative way.

Considering even a scenario in which the three-dimensional location margin of the aerial module or modules is 3 cm, the systems can work in a frequency band whose maximum frequency is 5 GHz (positioning accuracy of half wavelength, which for 5 GHz is 3 cm). Even with this working frequency, superior object detection is achieved, efficiently maintaining a compromise between resolution in range or depth (with a maximum bandwidth of 5 GHz a resolution in depth of 3 cm is achieved) and the capacity of the electromagnetic wave to penetrate the subsoil (the depth of penetration decreases with increasing frequency, since there is more attenuation).

Thanks to its configuration, the aerial module or modules of the present invention are capable of positioning with an accuracy of equal to or less than three centimetres which, at the working frequencies considered, allows the application of SAR processing techniques through the coherent combination of the radar signal measurements taken in different positions.

The SAR processing allows creating, as its name suggests, a synthetic aperture that increases the cross-range resolution (direction of movement parallel to the ground) of the radar system. On the contrary, the point-to-point representation of the radar signal processed only in range supposes a loss of resolution in cross-range with respect to the SAR processing (FIG. 1).

The possibility of obtaining three-dimensional images with higher resolution than other GPR systems, allows to detect and locate smaller objects even when they are buried at a shallow depth, still being possible in these cases to distinguish between the reflection at the air-ground interface (echo in the soil) and the reflection in the buried object (echo in the buried object).

The fact of employing any of the systems of the invention, with at least one aerial module, allows to perform the exploration of the area under study in a sufficiently fast time: up to 25 square meters in 10 seconds, as well as other exploration systems on board a UAV. This time is significantly shorter than that of detection systems on autonomous robots that move on the ground (half a meter in 10 seconds).

One of the realizations of the invention contemplates the use of a system composed by two aerial modules, such as two UAVs: in one the transmitter radar module is mounted, and in the other the receiver radar module is mounted. This configuration, called multistatic, allows to increase the spatial diversity of the radar signal, with the soil and the subsoil being illuminated from different angles, thus increasing the available information with respect to a monostatic configuration, which is the one used by most systems mounted for photogrammetry, SAR radar and GPR. Having more information allows to increase the detection capacity, making it possible to solve false echoes.

One of the radar signal processing algorithms of the invention is a clutter elimination algorithm of the radar image, which is used in combination with a SAR processing algorithm. The clutter elimination algorithm allows to eliminate that part of the received radar signal that is due to the reflection in the ground and that partially masks the echoes of the objects buried in the subsoil. The combination of the SAR processing and the clutter elimination algorithm therefore allows to increase the contrast between the noise or clutter and the objects present in the image of the reconstructed subsoil, increasing the detection capacity of the invention.

In a preferred embodiment of the invention, the set of radar signal processing algorithms also comprises an algorithm for correcting the defocusing of the radar image due to the uncertainty associated with the positioning and guidance system of the aerial module, and an algorithm for the detection of buried objects. The correction of the defocusing of the radar image increases the sharpness, facilitating the algorithm for the detection of buried objects to increase its probability of detection and to reduce the probability of false alarm or false detection.

In another preferred embodiment of the invention, the radar signal is received through two antennas with orthogonal polarizations, to provide polarization diversity or polarimetric information.

One of the embodiments of the radar signal processing method allows to obtain a clear image of the subsoil and the possible elements buried therein, thanks to the use of the SAR processing algorithm combined with an algorithm for elimination of the clutter and an algorithm to correct the defocused radar image. This defocusing is due to the oscillations of the UAV (caused by the wind, small changes in air pressure . . . ).

In an operating mode of any of the systems of the invention, the aerial module emits and/or captures radar signals establishing its position at different heights relative to the ground. Thus, a greater diversity of spatial information is available, which is advantageous in the application of the algorithm to correct the defocusing of the radar image by having a greater quantity of three-dimensional images of the subsoil taken in different positions, making it easier to calculate the displacement and lag necessary to compensate for the blur.

One method of the present invention is a process for characterizing the composition of the subsoil, using any of the systems of the invention. In this way, the same system can be used simultaneously to characterize a terrain or to detect elements buried in it. The same system can also be used only to perform a characterization of a subsoil, for example for agricultural applications. This characteristic gives the system a functional spectrum superior to that of other known systems. On the other hand, the determination of the composition of the subsoil, and in particular of the permittivity value, is used in the post-processing of the radar signal to correctly recover the position of the objects buried in the subsoil. Thus, if the permittivity value is known, it is possible to calculate the velocity of propagation of the radar signal in the subsoil, which, together with other variables such as the speed of propagation in other transition media, make the determination of the location of the buried objects accurate. The correct determination of the position of the objects buried in the subsoil also helps a better elimination of the clutter.

The method of characterization of the composition of the subsoil is not linked to a GPR system in particular, i.e., the method of characterization of the subsoil serves any GPR system, either on board an air vehicle, or for a forward looking GPR, etc. Even if in the GPR it is necessary to change some characteristic of the same (radar module, antennas . . . ) it is not necessary to recalibrate the method of characterization of the subsoil, since the algorithm of processing is independent of the system.

The method of characterizing the composition of the subsoil is simple and quick to implement by any operator of the invention. It only requires to bury in the subsoil to characterize a metallic object of reference, locate the aerial module on above it and launch a measurement (it is not necessary to perform a set of measurements). The subsoil characterization algorithm automatically determines the constitutive parameters, which will be used for the subsequent processing of radar measurements.

The method of characterization of the composition of the subsoil is based on the measurement of distances between reflections in known objects or surfaces, avoiding both the use of electromagnetic models that characterize the subsoil and the use of techniques of minimization or resolution of inverse electromagnetic problems, which increase the computational complexity of the system.

The invention is applicable in those sectors in which it is necessary to perform the detection of buried objects, as for example in civil applications for mine detection, pipe inspection, archaeology, and hole or cavity detection.

Figure 1:
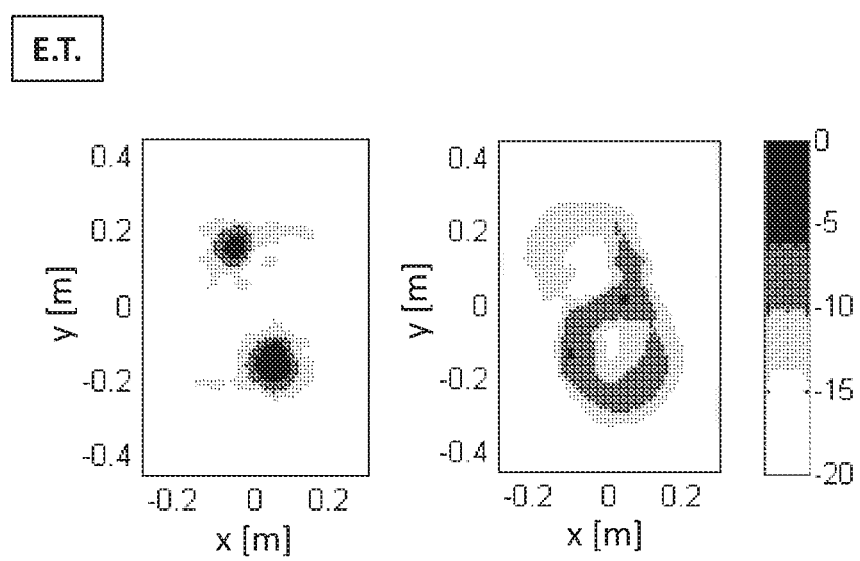
FIG. 1 corresponds to the State of the Art (E.T.) and represents a comparison between calculated radar images. In the graph on the left, the image is obtained using a SAR processing algorithm to obtain radar image. In the graph on the right, the image is obtained directly by representing the radar signal measured at each point (migrating the time axis to the axis of distances). The magnitude represented in each graph corresponds to the radar reflectivity normalized in units of decibels, whose scale is represented in the rule on the right with values from −20 to 0. The units of the axis 'x' and 'y' of the graphs are in meters [m]. The results represent two circular metallic objects located at (x; y)=(0.1; −0.15) m, y (x; y)=(−0.1; 0.18) m, buried 12 and 8 cm under the surface in a container of dimensions 0.35×0.45×0.2 m, filled with sand. The GPR radar carried out the scanning in a plane of 1 m×1 m at a height of 50 cm above the surface of the sand. As can be seen, in the graph on the left, where the SAR processing algorithm has been used, the two circular metal objects buried in the sand can be perfectly distinguished, corresponding to the maximum reflectivity values represented. On the contrary, in the graph on the right, where the radar signal measured at each point has been represented, it is not possible to identify said objects.
Figure 2:
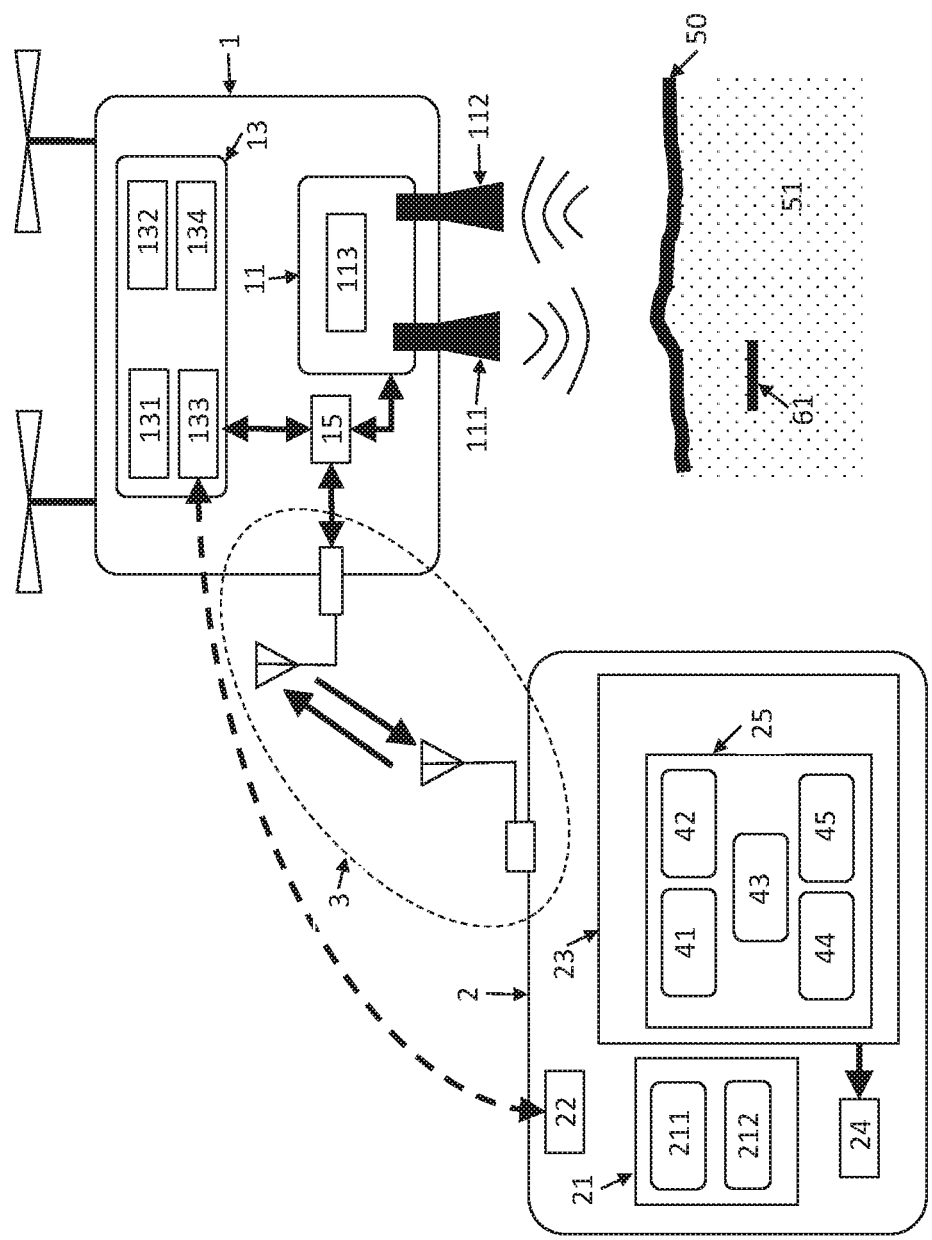
FIG. 2 shows a general scheme of the monostatic system in which the elements that compose it are identified. In the figure an air module (1) comprising a radar unit (11), a positioning and guidance system (13) of the air module (1) and an air control unit (15) can be seen. In the figure a communication system (3) bidirectional and in real time between the air module (1) and a ground station (2) can also be seen.

The air control unit (15) is connected to the positioning and guidance system (13) of the air module (1), to the radar unit (11) and to the bidirectional communication module (31).

The positioning and guidance system (13) comprises a global positioning system (131), a positioning system based on inertial sensors (132), a positioning system based on real-time satellite kinetic navigation (133) that exchanges information with a real-time satellite kinetic navigation base station (22) located at the ground station (2) and a photogrammetry-based positioning system (134).

The radar unit (11) comprises a transmitter antenna (111), a receiver antenna (112) and a radar module (113).

The ground station (2) comprises a real-time satellite kinetic navigation base station (22), a flight control system of the air module (21), a radar signal processing unit (23), a computer application for the representation of the radar image of the subsoil (24) from the information returned by the radar signal processing unit (23), and a bi-directional and real-time communication system (3) between the air module (1) and the ground station (2).

The flight control system of the air module (21) comprises a manual flight control system (211) and a system for the generation of trajectories and automatic flight control (212).

The radar signal processing unit (23) comprises a set of algorithms for radar signal processing (25), which at least consists of a SAR processing algorithm for obtaining the radar image (41) and an algorithm for eliminating the radar signal clutter of the radar image (42). The set of radar signal processing algorithms (25) further comprises an algorithm for correcting the defocusing of the radar image (43), and an algorithm for the detection of buried objects (45). The set of radar signal processing algorithms (25) also comprises an algorithm for the characterization of the composition of the subsoil (44).

This figure also shows a representation of the soil (50), subsoil (51) and a metallic calibration object (61) used for the characterization of the composition of the subsoil.

Figure 3:
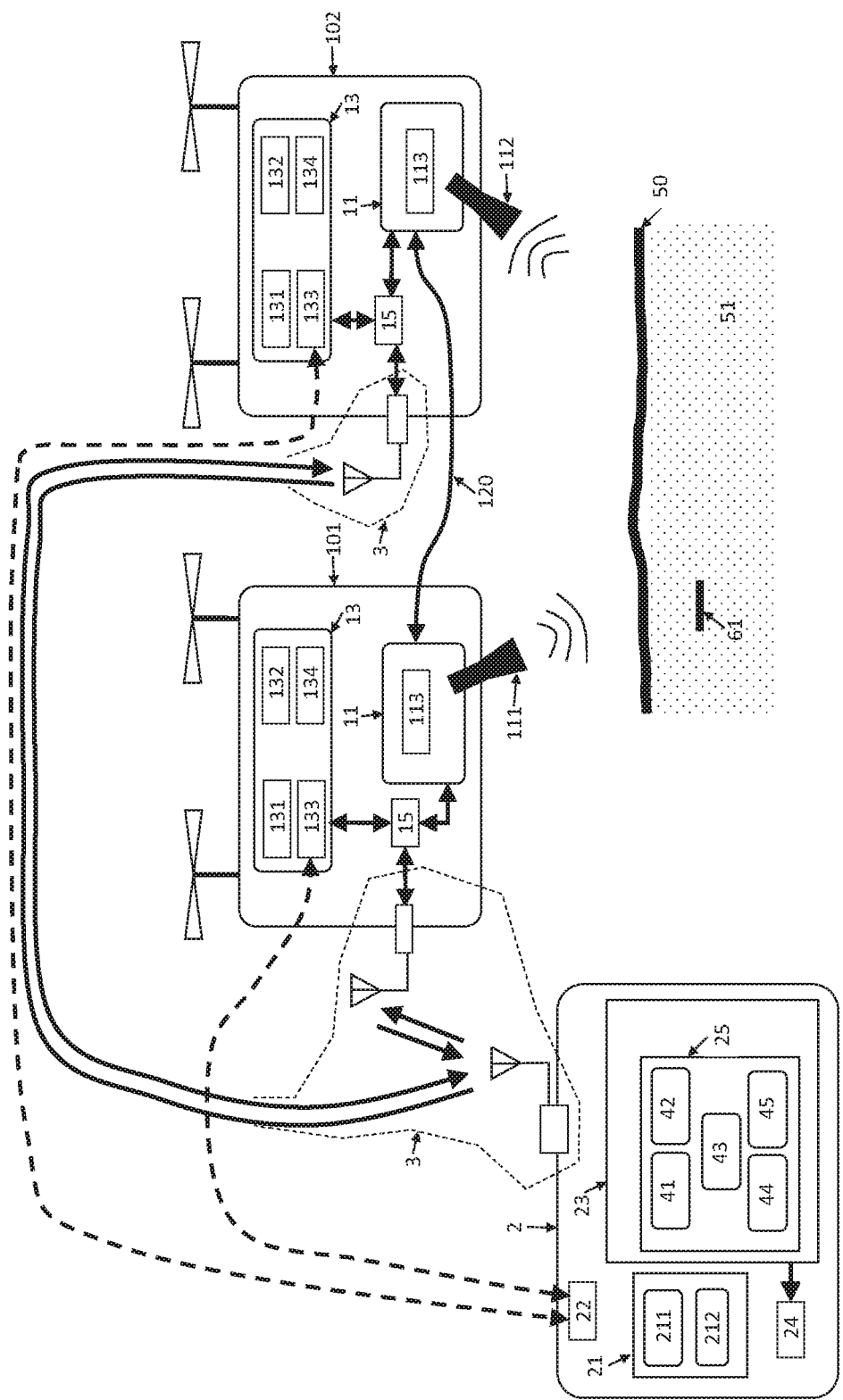

FIG. 3 shows an embodiment of the multistatic system in which two aerial modules are used to provide a multistatic radar configuration. This figure shows the elements that compose the ground station (2) shown in the previous figure, and the elements that compose the air modules, which are also similar to those in the previous figure. In a transmitter aerial module (101) a radar unit (11) comprising a radar module (113) that generates the radar signal to be transmitted through the transmitter antenna (111) is on board, and in the receiver aerial module (102) another radar unit (11) comprising a radar module (113) that receives the radar signal reflected on the soil (50), subsoil (51) and possible buried objects through the receiver antenna (112) is on board. This figure shows a real time bidirectional radar communication system (120) between the radar unit (11) on board the transmitter aerial module (101) and the radar unit (11) on board the receiver aerial module (102).

The real time bidirectional communication system (3) is also represented between the transmitter aerial module (101) and the receiver aerial module (102) and the ground station (2).

The positioning system based on real-time satellite kinetic navigation (133) of the positioning and guidance system (13) of each aerial module exchanges information with a real-time satellite kinetic navigation base station (22) located at the ground station (2).

Figure 4:
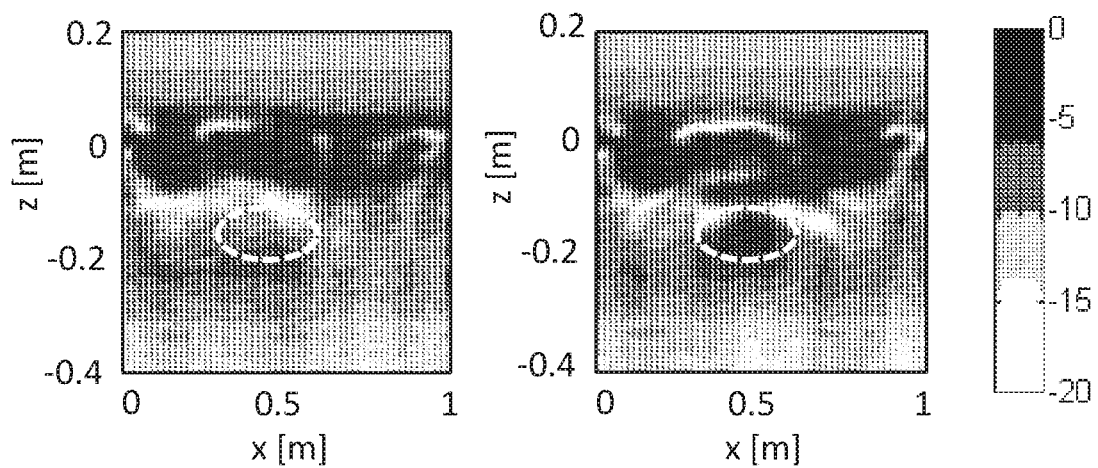

FIG. 4 corresponds to Example 4, which is described below, and represents a comparison between radar images calculated using both the method and the measurement scenario described in said example. The graph on the left shows the reflectivity of the soil (50) and subsoil (51) for the case in which no object has been buried in the subsoil (51), and the graph on the right shows the reflectivity of soil (50) and subsoil (51) for the case in which the metallic object has been buried at a depth of 15 cm.

The magnitude represented in each graph corresponds to the radar reflectivity normalized in units of decibels, whose scale is represented in the rule on the right with values from −20 to 0. The units of the axes 'x' and 'z' of the graphs are in meters [m]. The dotted line represents the known position where the metallic object is buried.

In both graphs the soil reflectivity (50) can be observed, identified as a black band at the position z=0 m, which occupies the entire width of the graphs. In the case of the graph on the right, the metallic object corresponds to the black region centred on x=0.5 m, z=−0.17 m.

EXAMPLES

For a better understanding of the present invention, the following examples of preferred embodiments, which must be understood without limiting the scope of the invention, are described in detail. The following description, taken in conjunction with the referenced drawings, is presented to enable one of ordinary skilled in the art to make and use the invention and to incorporate it to in the context of particular applications. Various modifications, as well as a variety of uses in different applications, will be readily apparent to those skilled in the art, and the general principles defined herein may be applied to a wide range of embodiments.

Example 1

A first embodiment of the invention was based on the use of a single aerial module (1), consisting of an unmanned aerial vehicle, in particular a multirotor and, more specifically, an octocopter, with its corresponding controller and battery set. The octocopter used, together with the controller and batteries, had a maximum take-off weight of 6 kg, with a payload capacity of 1.5 kg. This payload capacity was used to mount and integrate the following elements into the octocopter:

An air control unit (15), which was implemented using a microcontroller (Raspberry Pi type) and was programmed to collect information from the radar unit (11) and the positioning and guidance system (13), to control flight parameters of the air module (1), and to exchange information with a ground station (2). The octocopter incorporated a three-axis stabilizing system on which the radar unit (11) was mounted to partially compensate for the oscillations produced during the flight.

An IEEE 802.11 (Wi-Fi) interface that belonged to the bidirectional real-time communication system (3) between the air module (1) and the ground station (2). This interface was connected to the air control unit (15).

A positioning and guidance system (13) of the aerial module (1). This system was composed by four subsystems, described below: i) positioning system based on inertial sensors (132) that were incorporated in the octocopter controller; ii) global positioning system (131): the GPS receiver included in the octocopter controller was used; iii) positioning system based on real-time satellite kinetic navigation (133) to exchange information with a real-time satellite kinetic navigation base station (22) located at the ground station (2): two RTK units were acquired, one was placed at the ground station, and the other aboard the air module (1). These RTK units used a Wi-Fi radio link, Bluetooth or a 433 MHz transceiver to send the information for correction of the GPS coordinates from the receiver of the RTK base station, to the GPS unit with RTK functionality on board the air module (1). Therefore, the information provided by the RTK unit and the information provided by the GPS were combined to obtain the georeferenced coordinates of the air module (1); iv) Photogrammetry-based positioning system (134): implemented with a webcam on board the octocopter, allowing to send photographs each time a measurement is launched by the radar unit (11). From the digital processing of two or more images taken at different time intervals it was possible to determine the movement of the octocopter from one position to another, indicating it as a relative displacement in the plane parallel to the soil (50) (horizontal plane).

The spatial information provided by the four positioning subsystems (131) to (134) was processed by a data fusion technique implemented in a microcontroller (Raspberry Pi type) that returns a single set of georeferenced spatial coordinates of the air module (1).

With respect to the radar unit (11), the radar module (113) was implemented by means of an ultrawideband radar module (PulsOn P410), operating in the 3 to 5 GHz band. This module can be remotely controlled, so that the trigger command (generation of the radar signal) and the request command to send data (radar signal received and digitized) could be sent. As transmitting antenna (111), a helix type antenna (circular polarization to the left) of 12 dB of gain was used, with parameter S11 in the band of 3 to 5 GHz less than −12 dB. The receiver antenna (112) that was used was practically the same as the transmitting antenna (111), but with circular polarization to the right.

The ground station (2) and the elements that compose it were implemented and integrated as follows:

Flight control system (21) of the air module (1). For the manual flight control system (211), the remote control that came standard with the octocopter was used. Regarding the system for generating trajectories and automatic flight control (212), a computer application was developed that allows the operator to specify the coordinates of the trajectory that the aerial module (1) has to follow over the area under study. The system was configured to operate using the coordinates provided by the system for generating trajectories and automatic flight control (212), giving priority to the manual flight control system (211) to be able to retake control over the air module (1) in case it was necessary.

Radar signal processing unit (23). It was implemented on a laptop computer, which executed the radar signal processing algorithms (25). These algorithms were programmed using a high-level programming language (the one provided by the Matlab Company).

Computer application for the representation of the radar image of the subsoil (24). A graphic computer application was developed that allows the system operator to visualize the reflectivity of the soil (50), subsoil (51), and possible buried objects. The computer application was developed in such a way that the user has different display options (volumetric, representation in cuts according to horizontal, vertical planes or a combination of both). Also, the computer application highlights the objects found based on the information provided by the algorithm for the detection of buried objects (45) that was executed in the radar signal processing unit (23).

Real-time satellite kinetic navigation base station (22): consisted of one of the two RTK units mentioned above. The other RTK unit was mounted on the air module (1).

An IEEE 802.11 (Wi-Fi) interface that belonged to the real-time bidirectional communication system (3) between the air module (1) and the ground station (2). This interface was connected to the laptop that implemented the radar signal processing unit (23) and the system for the generation of trajectories and automatic flight control (212), and also to the control that implemented the manual flight control system (211) of the aerial module.

Example 2

For this embodiment, the system described in Example 1 was used, although changing the helix-type receiver antenna (112) by a two-element array receiver antenna (112): one element consisted of a right-handed circularly polarized helix antenna, and the other element consisted of a left-handed circularly polarized helix antenna, both with gain and S11 similar to the transmitting antenna. Each of the elements of the array was connected to a switch that allowed to acquire the received radar signal in one element of the array or in the other element of the array.

Example 3

For this realization, a system similar to that described in Example 1 was used, although using two aerial modules (octocopters): an aerial module (1) that was an aerial transmitter module (101) with a radar unit (11) that transmitted a radar signal, and another aerial module (1) that was a receiver aerial module (102) with a radar unit (11) that captured the radar signal.

The synchronization between the transmitter aerial module (101) and the receiver aerial module (102) was achieved by communication means comprising a real time bi-directional radar communication system (120) between the radar module (113) on board the transmitter aerial module (101) and the radar module (113) on board the receiver aerial module (102).

This communication system was included within the functionality of the radar module (113) (PulsOn P410), so that this existing functionality could be used to extend the system to multistatic mode.

The determination of the position of both the transmitter aerial module (101) and the receiver aerial module (102) was carried out in the same way as described in example 1, so that the ground station (2) had the information of the three-dimensional location of the transmitter aerial module (101) and of the receiver aerial module (102) with a precision equal to or less than three centimetres.

Example 4

To apply the method for detecting, locating and obtaining images of buried objects, the system described in Example 1 with an aerial module (1) was used. The method comprised the following steps:

a) In a first step, a radar signal generated by the radar unit (11) was emitted to the soil (50) to be inspected.

b) The signal was reflected on the soil (50), subsoil (51) and possible objects buried in it, and was captured by the radar unit (11). The received radar signal was processed in the radar module (113) to convert it into a digital sequence that could be sent using the communication system (3) between the air module (1) and the ground station (2). In addition, the three-dimensional location of the aerial module (1) was determined with an accuracy equal to or less than 3 cm for the positions of the given trajectory.

c) The digital sequence corresponding to the received radar signal that was processed in the radar module (113) and the accurate three-dimensional location of the air module (1) were sent to the ground station (2) using the real time bi-directional communication system (3).

d) The radar signal was received at the ground station (2) and processed in the radar signal processing unit (23) to obtain a three-dimensional image of the subsoil (51) and to detect and locate possible buried objects using a set of radar signal processing algorithms (25) comprising a SAR processing algorithm for obtaining the radar image (41) and a clutter elimination algorithm for the radar image (42).

Once the radar signal and the three-dimensional location of the air module (1) were received at the ground station (2), the position of the air module (1) was changed and steps a), b) and c) were repeated before the stage d).

The positions of the trajectory described by the aerial module (1) were created using the system for the generation of trajectories and automatic flight control (212). Positions located at different heights on the same point on the soil (50) were considered, which increased the diversity of information that allowed to improve the capacity to detect, locate and obtain the image of the soil (50) and the objects buried in the subsoil (51).

The radar signal data received at the ground station (2) for each position of the air module (1) was stored in a matrix, where each row of the matrix corresponded to a position of the air module (1). Also, the three-dimensional location data of the air module (1) was stored in a coordinate matrix. Using the information of the positions of the aerial module, and knowing the size of the subsoil (51) to be inspected, a transformation matrix relating the points of the subsoil (51) with the positions of the air module (1) was created. The SAR processing algorithm (41) performed mathematical operations with the transformation matrix and the matrix of the digitized radar signal, so that the reflectivity of the soil (50) and subsoil (51) was calculated. This reflectivity was further processed using the clutter removal algorithm of the radar image (42) to highlight the possible presence of buried objects and to eliminate the ground reflection of the soil (50).

To compensate for the defocusing of the radar image due to the uncertainty associated with the positioning and guidance system (13) of the air module (1), the SAR processing algorithm (41) and the clutter elimination algorithm (42) were combined with an algorithm for correcting the defocusing of the radar image (43) due to the uncertainty associated with the positioning and guidance system (13). The algorithm to correct the defocusing of the radar image (43) implemented the method called Phase Gradient Autofocus (PGA), which consisted of identifying characteristic points in different radar images, so that it corrected the defocusing by applying windowing and phase difference operations.

By means of an algorithm for the detection of buried objects (45) the three-dimensional image was processed looking for groups of points with high reflectivity, which could correspond to buried objects. The algorithm for the detection of buried objects (45) analysed the shape of the area or volume with high reflectivity and, based on training patterns stored in a database, decided whether it corresponded to a potential buried object or not. These training patterns were obtained from photographs of different types of buried objects (antipersonnel mines, archaeological remains, pipes, etc.) and could be calculated before scanning the area under study.

Finally, the reflectivity of the soil (50), subsoil (51) and possible objects buried in it was shown as a three-dimensional image of the subsoil (51) in the computer application for the representation of the radar image of the subsoil (24), where the objects that had been detected by the algorithm for the detection of buried objects were highlighted (45).

The method described in this example was applied by flying the aerial module (1) over a sandy subsoil (51) of homogeneous composition (geographical location: IVora beach, Gijón, Asturias). The trajectory consisted of a horizontal displacement of 1 m according to a reference axis 'x', at a height of 0.5 m above the soil (50) with a roughness of approximately 5 cm (microdunes). A metallic object of 15 cm diameter and 2 cm thickness was buried at a depth of 15 cm in the sandy subsoil (51).

The reflectivity of the subsoil in the plane 'x-z' was represented, where 'z' corresponded to the height axis with respect to the average height of the soil (50) (see FIG. 4). The graph on the left shows the reflectivity of the soil (50) and subsoil (51) when no object was buried in the subsoil (51), and the graph on the right shows the reflectivity of the soil (50) and subsoil (51) when the metallic object described before was buried in the subsoil (51). The ability of the method to perform the detection of the metallic object buried in the subsoil (51), denoted with a dotted line, could be verified. In both graphs it was possible to observe the reflectivity of the soil (50), identified as a black band at the position z=0 m, and occupying the entire width of the graph. In the case of the graph on the right, the metallic object corresponded to a black region centred at x=0.5 m, z=−0.17 m.

Example 5

For this embodiment, the method described in Example 4 was used, but the multistatic system described in Example 3 was considered, with a transmitter aerial module (101) and a receiver aerial module (102).

In this example, steps a), b) and c) prior to step d), described in example 4, were modified in the following way:

a) In a first step, a radar signal was transmitted by the radar unit (11) on board the transmitter aerial module (101) towards the soil (50) to be inspected.

b) The signal was reflected in the soil (50), subsoil (51) and possible objects buried in it, and was captured by the radar unit (11) on board the receiver aerial module (102). The synchronization between the radar unit (11) on board the transmitter aerial module (101) and the radar unit (11) on board the receiver aerial module (102) was carried out using the real time bidirectional radar communication system (120). The received radar signal was processed in the radar module (113) of the radar unit (11) on board the receiver aerial module (102). In addition, the three-dimensional location of the transmitter aerial module (101) and the receiver aerial module (102) with an accuracy of 3 cm or less for the positions of the considered trajectory was determined.

c) The digital sequence corresponding to the received radar signal that was processed in the radar module (113) of the radar unit (11) on board the receiver aerial module (102) and the accurate three-dimensional location of the transmitter aerial module (101) and the receiver aerial module (102) were sent to the ground station (2) using the real time bidirectional communication system (3).

Step d) was not modified with respect to the one described in example 4.

Once the radar signal and the three-dimensional location of the transmitter aerial module (101) and the receiver aerial module (102) were received at the ground station (2), the position of the receiver aerial module (102) was changed and the stages a), b) and c) were repeated prior to step d). The position of the transmitter aerial module (101) was not changed, thus obtaining a multistatic measuring system. In this example, for simplicity, positions located at different heights were not considered. All the positions of the trajectory described by the receiver aerial module (102) were at the same height with respect to the soil (50) as the transmitter aerial module (101).

The processing of the radar signal data received at the ground station (2) for each position of the receiver aerial module (102) was performed as described in example 4, except that in the coordinate matrix another row corresponding to the position of the transmitter aerial module (101) was added, but the remaining rows of this matrix were filled with the positions of the receiver aerial module (102).

Example 6

For this embodiment, the method described in Example 4 was used, but the polarimetric information obtained by the system described in Example 2 was considered.

In this example, for each position of the aerial module (1), steps a), b) and c) were carried out prior to step d), described in example 4.

In step b), the signal was reflected on the soil (50), subsoil (51) and possible objects buried in it. The reflected signal was received captured in the radar unit (11) by the two elements of the array of the receiver antenna (112) that was described in example 2. First, the switch commuted to the array element consisting of a helix-type antenna with right-handed circular polarization, and secondly, the switch commuted to the array element consisting of a helix-type antenna with left-handed circular polarization.

The radar signal data received at the ground station (2) for each position of the air module (1) and for each array element of the receiver antenna (112) were stored in a matrix.

The SAR processing algorithm for obtaining the radar image (41) performed mathematical operations with the transformation matrix and the matrix of the digitized radar signals and calculated the reflectivity of the soil (50) and subsoil (51) for each polarization, combining them in amplitude. Once combined, the resulting reflectivity was processed in the same way as described in the method of Example 4.

Example 7

To apply the method for the characterization of the subsoil (51) the system described in example 1 was used. The method comprised the following steps:

e) A metallic calibration object (61) was buried in the subsoil (51).

f) A radar signal generated by a radar unit (11) was emitted towards the soil (50) where the metallic calibration object (61) was buried.

g) The radar signal reflected in the soil (50), subsoil (51) and in the metallic calibration object (61) was captured through a radar unit (11) and the accurate three-dimensional location of the air module was determined (1) with an accuracy equal to or less than three centimetres.

h) The radar signal and the accurate three-dimensional location of the air module (1) were sent to the ground station (2) using the communication system (3);

i) The radar signal was processed in the radar signal processing unit (23) to characterize the composition of the subsoil (51) by means of an algorithm for the characterization of the composition of the subsoil (44) in which the echo in the soil (50) and the echo in a metal calibration object (61) were considered.

The algorithm for the characterization of the composition of the subsoil (44) carried out the estimation of the permittivity of the subsoil (51) from the determination of the distance and/or the difference in amplitude between the echo in the soil (50) and the echo in a metallic calibration object (61).

The calculated permittivity value was used as the input value for the application of the SAR processing algorithm for obtaining the radar image (41) and the algorithm for eliminating the clutter from the radar image (42).

The method described in this example was applied by flying the aerial module (1) over a sandy subsoil (51) of homogeneous composition (geographical location: Nora beach, Gijón, Asturias). From the recommendation published in (Calculation of soil moisture [retrieved on 2016-15-1] Recovered from the Internet: <http://maizedoctor.org/es/estimacion-de-la-humedad-del-suelo/>), it was estimated that the moisture content of the sandy subsoil (51) was between 6 and 8%. The metallic calibration object (61) was buried at 15 cm. After applying the method described in this example, an estimation of the permittivity range of the sandy subsoil (51) between 5.4 and 6.2 was obtained.

The permittivity estimated with the method described in this example was compared with the reference value published in the article by Fratticcioli, E., Dionigi, M., & Sorrentino, R. (2003, October). A new permittivity model for the microwave moisture measurement of wet sand. *Proceedings of the* 33*rd European Microwave Conference,* 2003. (pp. 539-542). In this article, for a sandy subsoil (51) with a moisture content between 6 and 8%, a permittivity range between 5 and 7 was provided, in accordance with the range obtained after applying the method (5.2 to 6.4).

The invention claimed is:

1. Airborne system for detection, location and imaging of buried objects, comprising:
    an air module which comprises a radar unit that emits and captures radar signals, a positioning and guidance system of the air module, and an air control unit which collects information from the radar unit and from the positioning and guidance system, controls flight parameters of the air module and exchanges information with a ground station;
    a ground station which comprises a flight control system of the air module, a radar signal processing unit that processes the radar signals received from the radar unit by means of a set of radar signal processing algorithms, and a computer application for the representation of the radar image of the subsoil obtained from the radar signal processing unit; and
    communication means for transmitting and receiving wireless signals between the air module and the ground station:
    wherein the positioning and guidance system of the aerial module comprises a global positioning system, a positioning system based on inertial sensors, a positioning system based on real-time satellite kinetic navigation exchanging information with a real-time satellite kinetic navigation base station located at the ground station, and a photogrammetry-based positioning system, which send information to the control unit providing the accurate three-dimensional location of the air module and the georeference of the data obtained with the radar unit with an accuracy equal to or less than three centimeters, and wherein radar signal processing algorithm of the radar signal processing unit includes
    a SAR, processing algorithm for obtaining the radar image wherein said SAR processing algorithm uses polarimetric information based on the measurement of the radar signal corresponding to two orthogonal polarizations of the scattered electric field;
    an algorithm for the characterization of the composition of the subsoil which carries out the estimation of the permittivity of the subsoil from the determination of the distance between the echo in the soil and the echo in a metallic calibration object, both observable in the radar image; and a clutter elimination algorithm of the radar image.

2. Airborne system for detection, location and imaging of buried objects, comprising:
    a transmitter aerial module, which comprises a first radar unit that emits radar signals, a positioning and guidance system of the transmitter aerial module, and an air control unit which collets information from the radar unit and from the positioning and guidance system, controls flight parameters of the transmitter aerial module and exchanges information with a ground station;
    a receiver aerial module, which comprises a second radar unit that captures the radar signal, a positioning and guidance system of the receiver aerial module, and an air control unit which collects information from the second radar unit and positioning and guidance system, controls flight parameters of the receiver aerial module and exchanges information with a ground station;
    a ground station which comprises a flight control system of the transmitter aerial module and of the receiver aerial module, a radar signal processing unit that processes the radar signals received from the second radar unit by means of a set of radar signal processing algorithms, and a computer application for the representation of the radar image of the subsoil obtained from the radar signal processing unit; and
    communication means for transmitting and receiving wireless signals between the transmitter aerial module and the ground station, between the receiver aerial module and the ground station, and between the transmitter aerial module and the receiver aerial module;
    wherein the positioning and guidance system of the transmitter aerial module and of the receiver aerial module each comprises a global positioning system, a positioning system based on inertial sensors, a positioning system based on real-time satellite kinetic navigation exchanging information with a real-time satellite kinetic navigation base and station located at the ground station, and a photogrammetry-based positioning system, which send information to the air control unit providing the accurate three-dimensional location of the transmitter aerial module and the receiver aerial module and the georeference of the data obtained with the second radar unit with an accuracy equal to or less than three centimeters, and wherein a radar signal processing algorithm of the radar signal processing unit includes
    a SAR processing algorithm for obtaining the radar image wherein said SAR processing algorithm uses polarimetric information based on the measurement of the radar signal corresponding to two orthogonal polarizations of the scattered electric field;
    an algorithm for the characterization of the composition of the subsoil which carries out the estimation of the permittivity of the subsoil from the determination of the distance between the echo in the soil and the echo in a metallic calibration object, both observable in the radar image; and a clutter elimination algorithm of the radar image.

3. System according to claim 1, wherein aerial module is an unmanned aerial vehicle.

4. System according to claim 3, wherein the unmanned aerial vehicle is a multi-rotor.

5. System according to claim 1, wherein the communication means comprise a bi-directional and real-time communication system between the air module and the ground station.

6. System according to claim 2, wherein the communication means comprise a bi-directional and real-time communication system between the transmitter aerial module and the ground station a bi-directional and real-time communication system between the receiver aerial module and the ground station and a real-time bi-directional radar communication system between the first radar unit on board the transmitter aerial module and the second radar unit on board the receiver aerial module.

7. System according to 5, wherein the communication system or the radar communication system comprise one or more 3G/4G communication modules or one or more low frequency transceivers or an IEEE interface 802.11 (Wi-Fi) or one or more Zigbee modules or one or more Bluetooth modules, or a combination of the above.

8. System according to claim 1, wherein the radar unit comprises:
a transmitter antenna and a receiver antenna;
a radar module for the generation of an electromagnetic signal in the working frequency band whose upper frequency is equal to or less than 5 GHz, and
for the reception of the scattered electromagnetic signal.

9. System according to claim 2, wherein the first radar unit on board the transmitter aerial module comprises:
a transmitting antenna;
a radar module for the generation of an electromagnetic signal in the working frequency band whose upper frequency is equal to or less than 5 GHz.

10. System according to claim 2, wherein the second radar unit on board the receiver aerial module comprises:
a receiver antenna;
a radar module for receiving the scattered electromagnetic signal.

11. System according to claim 1, wherein the flight control system of the air module comprises:
a manual flight control system; and
a system for the generation of trajectories and automatic flight control.

12. System according to claim 1, wherein the set of radar signal processing algorithms also comprising: an algorithm for correcting the defocusing of the radar image due to the uncertainty associated with the positioning and guidance system of the air module; and
an algorithm for the detection of buried objects.

13. System according to claim 1, wherein algorithm for the characterization of the composition of the subsoil carries out the estimation of the permittivity of the subsoil from the measurement of the difference in amplitude between the echo in the soil and the echo in a metal calibration object.

14. System according to claim 1, wherein the algorithm for eliminating the clutter from the radar image is based on an iterative calculation process in which the effect of the soil on the radar image is identified on the basis of the altitude of the aerial module and on the estimation of the composition of the subsoil provided by the algorithm for the characterization of the composition of the subsoil and later eliminated from the image using a mask-based algorithm and a SAR processing algorithm for obtaining the radar image.

15. System according to claim 1, wherein the aerial module emits and captures radar signals establishing its position at different heights relative to the soil.

16. System according to claim 15, wherein the radar image created with the radar signals obtained at different heights are combined to detect, locate and obtain the image of the soil and of the objects buried in the subsoil.

17. System according to claim 15, characterized in that the radar image created with the radar signals obtained at different heights are combined to detect, locate and obtain the image of the soil and of the objects buried in the subsoil.

18. System according to claim 1, wherein the SAR processing algorithm for obtaining the radar image is based on the coherent sum of the radar signal measured in two or more positions of the aerial module, provided that the separation between two consecutive positions is equal to or less than half a wavelength at the highest working frequency.

19. Method for detecting, locating and obtaining images of buried objects by
a system wherein airborne means for emitting and capturing radar signals are in wireless communication with a ground station;
said means for emitting and capturing radar signals optionally being contained in a single module; and
said ground station comprising a flight control system, a radar signal processing unit that processes the radar signals received a radar unit by means of a set of radar signal processing algorithms, and a computer application for the representation of the radar image of the subsoil obtained from the radar signal processing unit;
wherein a positioning and guidance system of the means for emitting and capturing radar signals comprises a global positioning system, a positioning system based on inertial sensors, a positioning system based on real-time satellite kinetic navigation exchanging information with a real-time satellite kinetic navigation base station located at the ground station, and a photogramrnetry-based positioning system, which send information to the control unit providing the accurate three-dimensional location of the means for emitting and capturing radar signals and the georeference of the data obtained with the radar unit with an accuracy equal to or less than three centimeters, and characterized in that a radar signal processing algorithm of the radar signal processing unit includes
a SAP, processing algorithm for obtaining the radar image wherein said SAR processing algorithm uses polarimetric information based on the measurement of the radar signal corresponding to two orthogonal polarizations of the scattered electric field;
an algorithm for the characterization of the composition of the subsoil which carries out the estimation of the permittivity of the subsoil from the determination of the distance between the echo in the soil and the echo in a metallic calibration object, both observable in the radar image; and
a clutter elimination algorithm of the radar image,
said method comprising the following steps:
a) emit a radar signal generated by a radar unit towards the soil to be inspected;
b) capture the radar signal reflected in the soil, subsoil and possible buried objects, through a radar unit and determine the accurate three-dimensional location of the air module with equal value accuracy or less than three centimeters;

c) send the radar signal and the accurate three-dimensional location of the air module to the ground station using the communication system;

d) process the radar signal in the radar signal processing unit to obtain a three-dimensional image of the subsoil and detect and locate possible buried objects by means of a set of radar signal processing algorithms comprising a SAR processing algorithm for obtaining the radar image and a clutter elimination algorithm for the radar image.

20. Method according to claim 19, wherein the emission of step a) is emitted from a transmitter aerial module with a radar unit transmitting a radar signal and the reception of step b) is carried out by a receiver aerial module with another radar unit which captures the radar signal, both located in two different positions, and characterized in that the emission and the reception are synchronized by means of a radar communication system.

21. Method according to claim 19, wherein the radar unit further processes the radar signal received in step b) to convert it to a digital sequence, and in step d) the radar signal processing unit processes the digitized radar signal.

22. Method according to claim 19, wherein the radar signal is an electromagnetic pulse train.

23. Method according to claim 19, wherein it also comprises varying the position of the airborne means and repeating steps a), b) and c) prior to step d).

24. Method according to claim 23, wherein the radar image created with the radar signals obtained in different positions are combined to detect, locate and obtain the image of the soil and of the objects buried in the subsoil.

25. The method according to claim 19, wherein the SAR processing algorithm for obtaining the radar image is based on the coherent sum of the radar signal measured in two or more positions of the airborne means, provided that the separation between two consecutive positions is equal to or less than half a wavelength at the highest working frequency.

26. Method according to claim 19, wherein in step d) the radar signal is processed in the radar signal processing unit by a set of radar signal processing algorithms also comprising an algorithm for correcting the defocusing of the radar image and an algorithm for the detection of buried objects.

27. The method according to claim 19, wherein, prior to step a), it also comprises the following steps:

e) bury a metallic calibration object in the subsoil;

f) emit a radar signal generated by a radar unit towards the soil where the metallic calibration object is buried;

g) capture the radar signal reflected in the soil, subsoil and in the metallic calibration object, through a radar unit and determining the accurate three-dimensional location of the air module with an accuracy of equal to or less than three centimeters;

h) send the radar signal and the accurate three-dimensional location of the air module to the ground station using the communication system;

i) process the radar signal in the radar signal processing unit to characterize the composition of the subsoil by means of an algorithm for the characterization of the composition of the subsoil in which the echo in the soil and the echo in a metallic calibration object are considered.

28. Method according to claim 27 wherein steps e), f), g), h) and i) to characterize the composition of the subsoil are executed once, prior to step a).

29. Method according to claim 27, wherein the algorithm for the characterization of the composition of the subsoil carries out the estimation of the permittivity of the subsoil from the measurement of the difference in amplitude between the echo in the soil and the echo in a metal calibration object.

30. Method according to claim 27 wherein the algorithm for eliminating the clutter from the radar image is based on an iterative calculation process in which the effect of the ground on the radar image is identified based on the altitude of the aerial module and the estimation of the composition of the subsoil that provides the algorithm for the characterization of the composition of the subsoil, and subsequently it is eliminated from the image using a mask-based algorithm and a SAR processing algorithm for obtaining the radar image.

31. Method for characterizing the composition of the subsoil by:

a system wherein airborne means for emitting and capturing radar signals are in communication with a ground station;

said means for emitting and capturing radar signals optionally being contained in a single module; said ground station comprising a flight control system, a radar signal processing unit that processes the radar signals received from a radar unit by means of a set of radar signal processing algorithms, and a computer application for the representation of a radar image of the subsoil obtained from the radar signal processing unit wherein a positioning and guidance system of the means for emitting and capturing radar signals comprises a global positioning system, a positioning system based on inertial sensors, a positioning system based on real-time satellite kinetic navigation exchanging information with a real-time satellite kinetic navigation base station located at the ground station, and a photogrammetry-based positioning system, which send information to the control unit providing the accurate three-dimensional location of the means for emitting and capturing radar signals and the georeference of the data obtained with the radar unit with an accuracy equal to or less than three centimeters, and wherein a radar signal processing algorithm of the radar signal processing unit is a SAR processing algorithm for obtaining the radar image and another is a clutter elimination algorithm of the radar image system wherein airborne means for emitting and capturing radar signals are in wireless communication with a ground station which comprises a flight control system, a radar signal processing unit that processes the radar signals received from the radar unit by means of a set of radar signal processing algorithms, and a computer application for the representation of the radar image of the subsoil obtained from the radar signal processing unit wherein a positioning and guidance system of the means for emitting and capturing radar signals comprises a global positioning system, a positioning system based on inertial sensors, a positioning system based on real-time satellite kinetic navigation exchanging information with a real-time satellite kinetic navigation base station located at the ground station, and a photogrammetry-based positioning system, which send information to the control unit providing the accurate three-dimensional location of the means for emitting and capturing radar signals and the georeference of the data obtained with the radar unit with an accuracy equal to or less than three centimeters, and characterized in that a radar signal processing algorithm of the radar signal processing unit includes a SAR processing algorithm for obtaining the radar image wherein said SAR processing algorithm uses polarimetric information based on the measurement of the radar signal corresponding to two orthogonal polarizations of the scattered electric field;

an algorithm for the characterization of the composition of the subsoil which carries out the estimation of the permittivity of the subsoil from the determination of the distance between the echo in the soil and the echo in a metallic calibration object, both observable in the radar image; and a clutter elimination algorithm of the radar image said method comprising the following steps:

a) bury a metallic calibration object in the subsoil;
b) emit a radar signal generated by a radar unit towards the soil where the metallic calibration object is buried;
c) capture the radar signal reflected in the soil, subsoil and in the metallic calibration object, through a radar unit and determining the three-dimensional location of the air module with an accuracy of equal to or less than three centimeters;
d) send the radar signal and the accurate three-dimensional location of the air module to the ground station using a communication system;
e) process the radar signal a radar signal processing unit to characterize the composition of the subsoil by means of an algorithm for the characterization of the composition of the subsoil in which the echo in the soil and the echo in a metallic calibration object are considered.

32. Method according to claim 31, wherein the emission in step b) is carried out from a transmitter aerial module with a first radar unit transmitting a radar signal, and the reception of step c) is carried out by means of a receiver aerial module with a second radar unit that captures the radar signal, both located in two different positions, wherein the emission and the reception are synchronized by means of a radar communication system.

33. Method according to claim 31, wherein the algorithm for the characterization of the composition of the subsoil carries out the estimation of the permittivity of the subsoil from the measurement of the difference of amplitude between the echo on the soil and echo on a metallic calibration object.

* * * * *